United States Patent

Van Der Merwe et al.

[11] Patent Number: 6,145,701
[45] Date of Patent: Nov. 14, 2000

[54] MACHINE FOR DISPENSING A SOFT-SERVE PRODUCT SUCH AS ICE-CREAM, FROZEN YOGHURT, OR THE LIKE

[75] Inventors: Marcel Van Der Merwe, P O Box 776, Stellenbosch 7599, South Africa; Mark Henry Erasmus, Constantia, South Africa

[73] Assignee: Marcel Van Der Merwe, Stellenbosch, South Africa

[21] Appl. No.: 09/202,779

[22] PCT Filed: Jul. 2, 1997

[86] PCT No.: PCT/US97/11274

§ 371 Date: Dec. 21, 1998

§ 102(e) Date: Dec. 21, 1998

[87] PCT Pub. No.: WO98/00360

PCT Pub. Date: Jan. 8, 1998

[30] Foreign Application Priority Data

Jul. 2, 1996 [ZA] South Africa ............................ 96/5613

[51] Int. Cl.[7] ........................................................ B67D 5/08

[52] U.S. Cl. .............................. 222/40; 99/455; 222/54; 222/57; 222/63; 222/145.1; 222/145.7; 222/146.6; 222/149; 222/413; 425/135; 425/145

[58] Field of Search ................................... 222/54, 57, 63, 222/145.1, 145.7, 135, 139, 410, 413, 23, 40; 99/455; 425/135, 145; 366/182.1

[56] References Cited

U.S. PATENT DOCUMENTS

| | | | |
|---|---|---|---|
| 3,181,838 | 5/1965 | Johansen | 259/8 |
| 3,749,305 | 7/1973 | Tatsudo | 235/94 R |
| 3,751,642 | 8/1973 | Todd et al. | 235/151.34 |
| 3,979,172 | 9/1976 | Sogo et al. | 425/104 |
| 4,052,180 | 10/1977 | Erickson | 62/188 |
| 4,758,097 | 7/1988 | Iles et al. | 366/149 |
| 4,771,915 | 9/1988 | Cand et al. | |
| 4,865,089 | 9/1989 | McFarlane | |
| 4,955,507 | 9/1990 | Kirschner et al. | 222/65 |
| 5,271,572 | 12/1993 | Grandi | 241/199.2 |
| 5,410,888 | 5/1995 | Kaiser et al. | 62/136 |
| 5,743,639 | 4/1998 | Puerner et al. | 222/410 X |

FOREIGN PATENT DOCUMENTS

| | | |
|---|---|---|
| 0007144 | 1/1980 | European Pat. Off. . |
| 0158386 | 10/1985 | European Pat. Off. . |
| 0221757 | 5/1987 | European Pat. Off. . |
| 0503254 | 9/1992 | European Pat. Off. . |
| 0509602 | 10/1992 | European Pat. Off. . |
| 0293022 | 11/1998 | European Pat. Off. . |
| 2223644 | 10/1974 | France . |
| 2232210 | 12/1990 | United Kingdom . |
| 2263687 | 8/1993 | United Kingdom . |
| 9107879 | 6/1991 | WIPO . |
| 9526640 | 10/1995 | WIPO . |

OTHER PUBLICATIONS

PCT Gazette abstract of WO 91/07879 of Jun. 1991.
PCT Gazette abstract of WO 95/26640 of Oct. 1995.
Abstract of EP0293022 of Nov. 1988.

*Primary Examiner*—Kevin Shaver
*Attorney, Agent, or Firm*—Ladas & Parry

[57] ABSTRACT

A machine for dispensing a soft-serve product comprises a freezer barrel (12), a mix hopper (14) for containing soft-serve mix (16) and being in flow communication with the freezer barrel so that soft-serve mix can flow from the mix hopper into the freezer barrel, a flow passage (42, 42.1) leading from the freezer barrel to a draw spout (64), and a beater assembly (20) for expelling frozen product from the freezer barrel via the flow passage to the draw spout. A solids hopper (52) for containing a flowable solid topping is further provided, and an archimedes screw (56) for feeding the solid topping from the solids hopper into the flow stream of soft-serve product as it passes through the flow passage. A vaned rotor (44) and a rotation sensor (80) meter the flow of soft-serve product through the flow passage and control the speed of a topping motor (60) driving the archimedes screw.

8 Claims, 6 Drawing Sheets

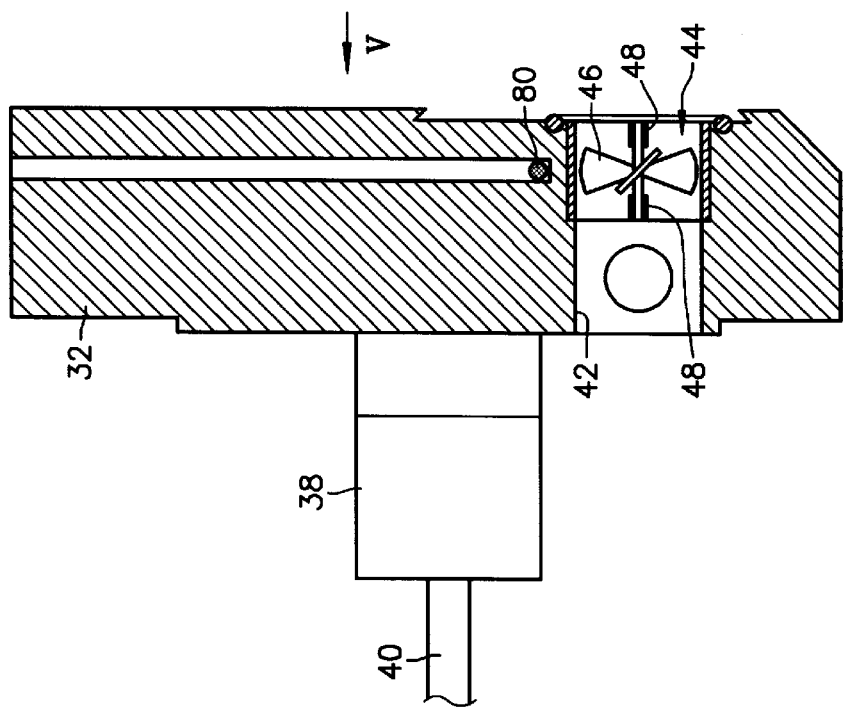
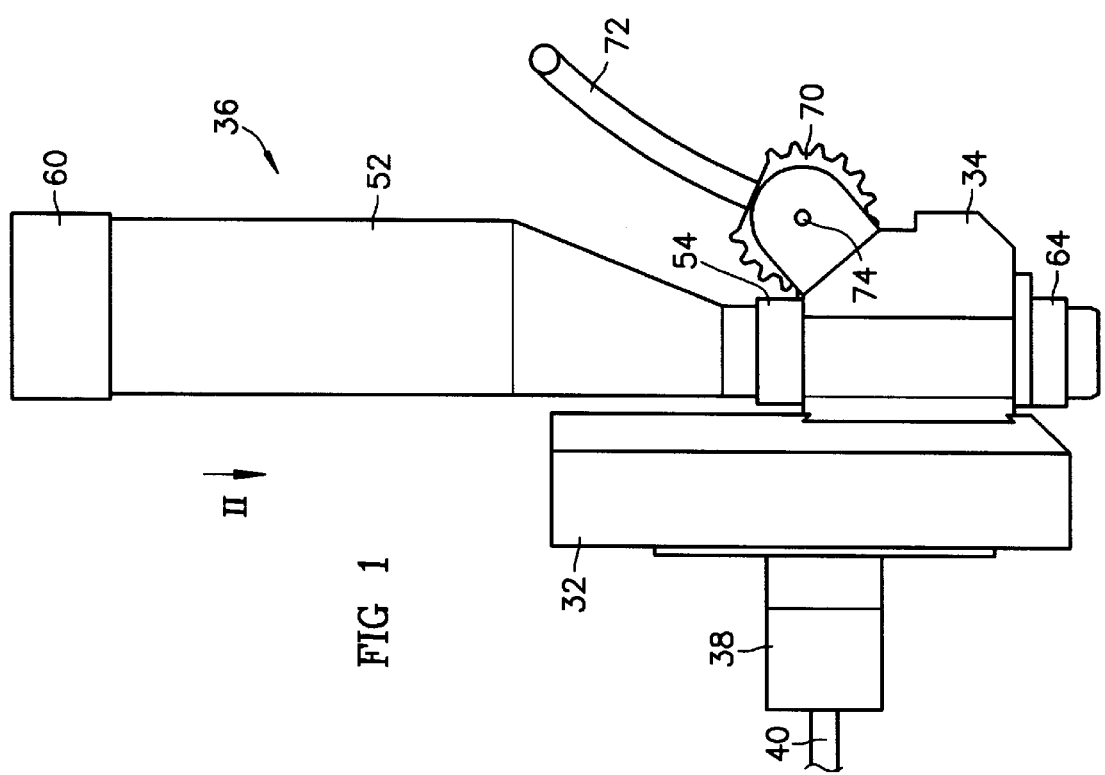

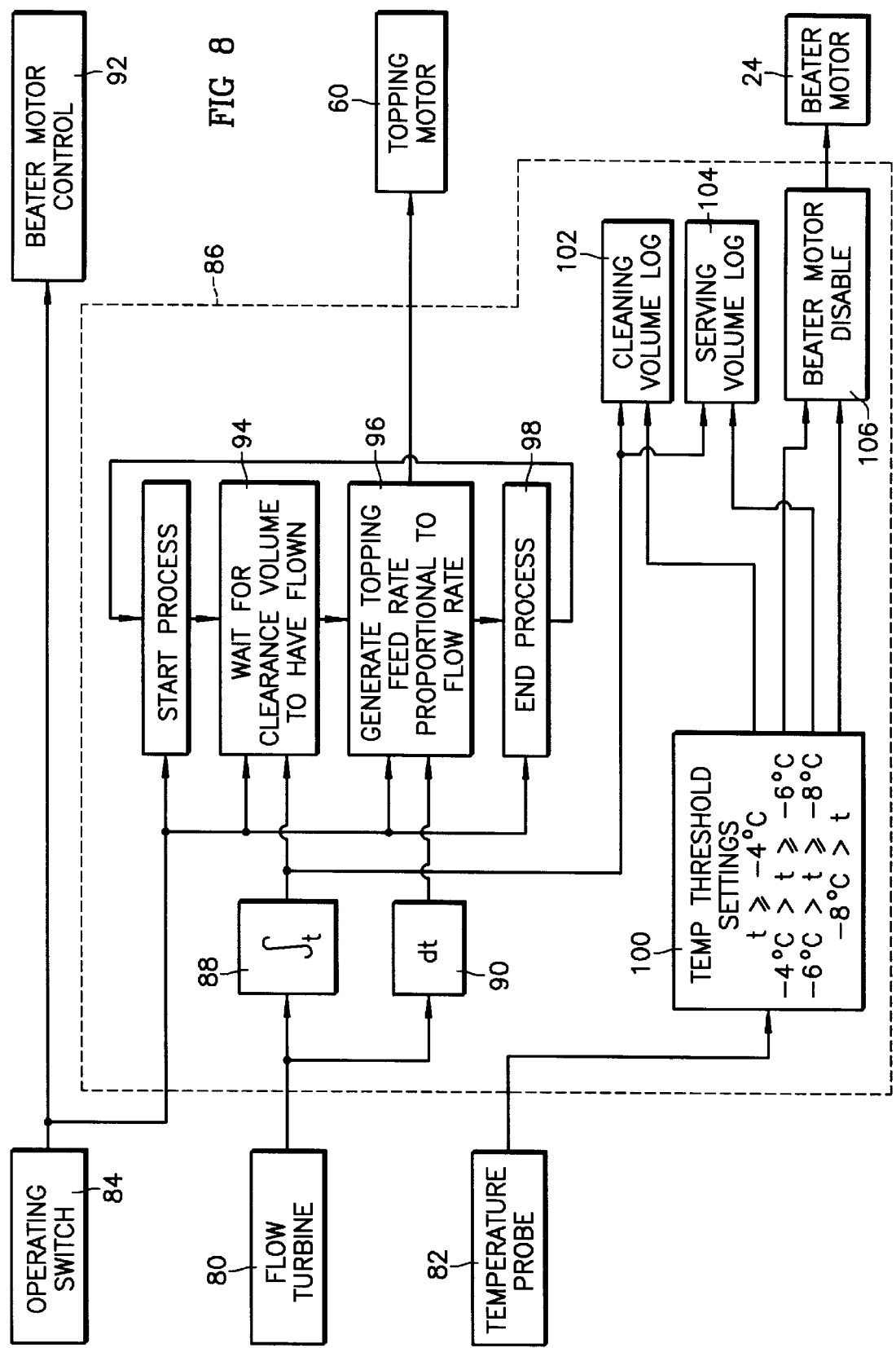

MACHINE FOR DISPENSING A SOFT-SERVE PRODUCT SUCH AS ICE-CREAM, FROZEN YOGHURT, OR THE LIKE

This invention relates to a machine for dispensing a soft-serve product.

In the present specification, where the expression soft-serve product is used, this shall be understood to include both soft-serve ice-cream and soft-serve frozen yoghurt. So-called soft-serve product is dispensed from a machine which comprises a mix hopper for receiving the soft-serve mix in a liquid form and a draw spout from which soft-serve emerges. The machine further includes a freezer barrel with refrigeration means surrounding it. The mix hopper is connected to the freezer barrel via an air tube assembly. A beater assembly in the barrel displaces the soft-serve mix along the barrel, into a vertical passage and out through the draw spout which is at the lower end of the passage. The beater assembly and refrigeration means run until a sensor in the circuit of the motor which drives the beater assembly senses a predetermined resistance. This indicates that the soft-serve is solidifying. The beater motor and refrigeration means then switch off. A timer switches the motor and refrigeration means on again after a predetermined delay and the cycle recommences.

A plunger which constitutes a valve slides up and down in the vertical passage down which soft-serve flows from the freezer barrel to the draw spout. When the plunger is in the position in which it closes off the exit from the freezer barrel, the beater assembly simply recycles the soft-serve in the barrel.

The opening in the air tube assembly which places the mix hopper in communication with the barrel is small and easily blocked by solid particles in the soft-serve mix. Thus, additives such as chocolate chips or nuts which it is desirable to incorporate into the soft-serve cannot be added to the mix hopper. They are thus added, after the soft-serve has been dispensed, as a topping.

According to one aspect of the present invention there is provided a machine for dispensing a soft-serve product, the machine comprising a freezer barrel, a mix hopper for containing soft-serve mix and being in flow communication with the freezer barrel so that soft-serve mix can flow from the mix hopper into the freezer barrel, a flow passage leading from the freezer barrel to a draw spout, means for expelling frozen product from the freezer barrel via the flow passage to the draw spout, a solids hopper for containing a flowable solid food product, and feed means for feeding said solid food product from the solids hopper into the flow stream of soft-serve product as it passes through said flow passage.

According to another aspect of the invention there is provided a machine for dispensing a soft-serve product, the machine comprising a freezer barrel, a mix hopper for containing soft-serve mix and being in flow communication with the freezer barrel so that soft-serve mix can flow from the mix hopper into the freezer barrel, a flow passage leading from the freezer barrel to a draw spout, means for expelling frozen product from the freezer barrel via the flow passage to the draw spout, and flow metering means for metering the flow of soft-serve product through the flow passage.

For a better understanding of the invention, and to show how the same may be carried into effect, reference will now be made, by way of example, to the accompanying drawings in which:

FIG. 1 is a side view of a freezer door assembly of a soft-serve dispensing machine in accordance with the invention;

FIG. 3 is a section on III—III in FIG. 2, of a door plate forming part of the assembly;

FIG. 8 is a block diagram illustrating the operation of the machine.

Figure 7:
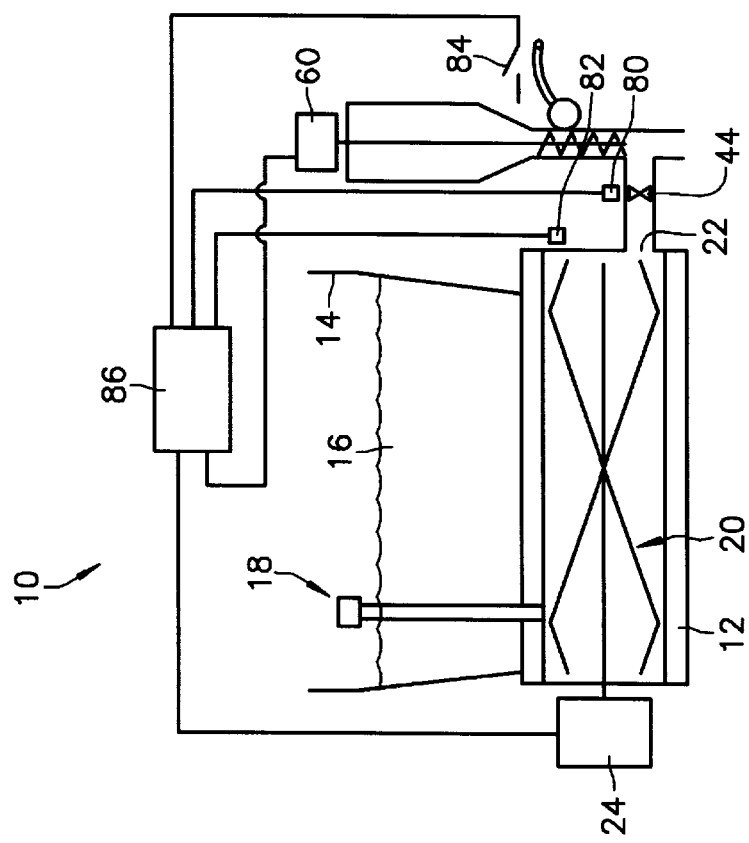
FIG. 7 is schematic drawing illustrating the various controls of the machine.
Figure 4:
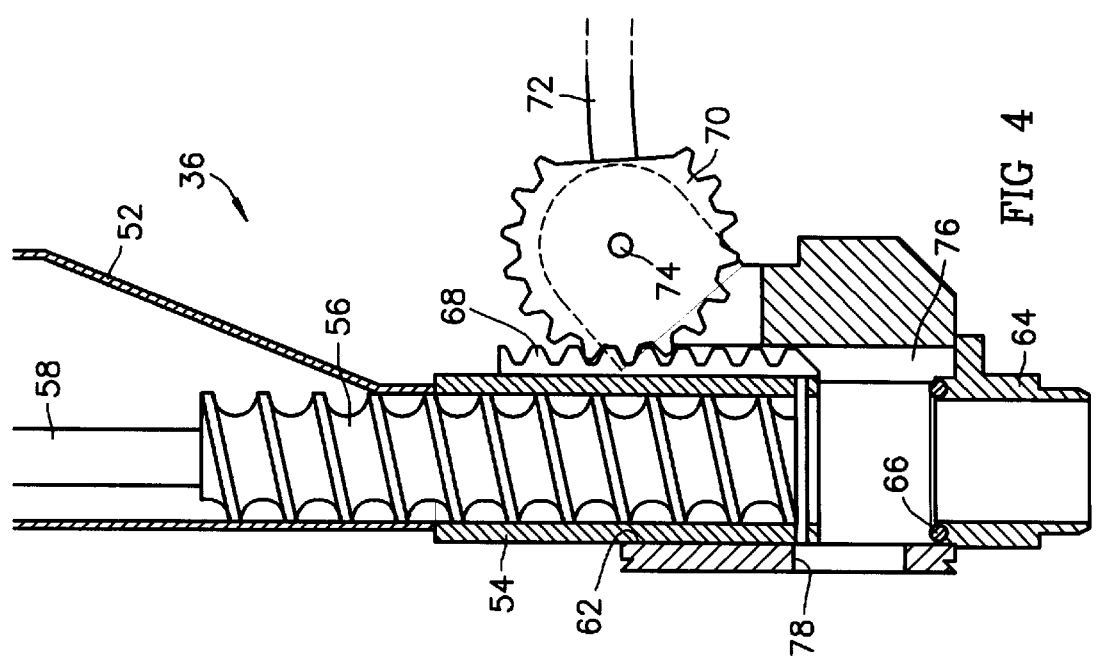
FIG. 4 is a section on IV—IV in FIG. 2, of a carrier forming part of the assembly, with the topping unit in place.
Figure 5:
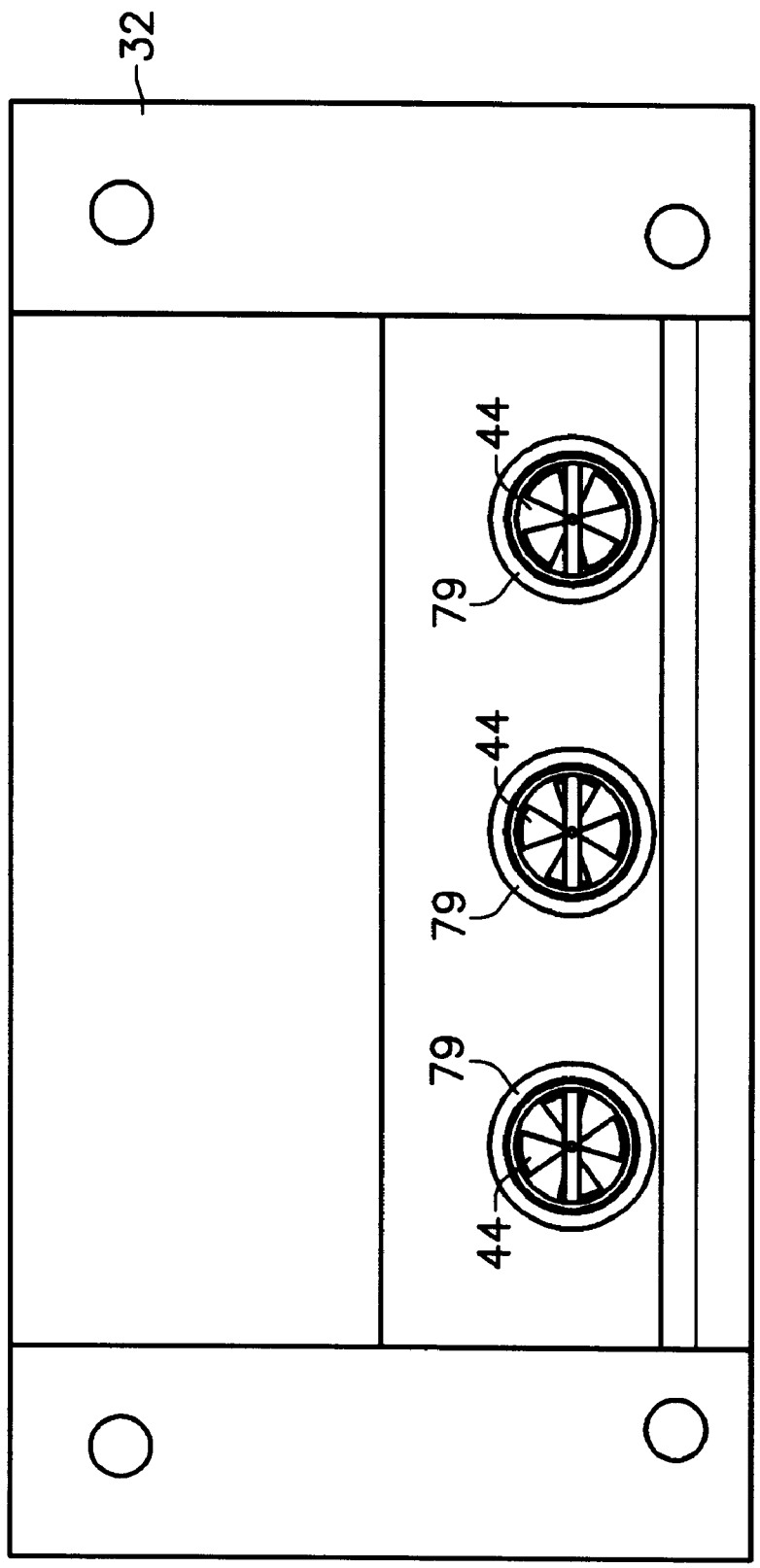
FIG. 5 is a front view of the door plate, in the direction of arrow V in FIG. 3.
Figure 6:
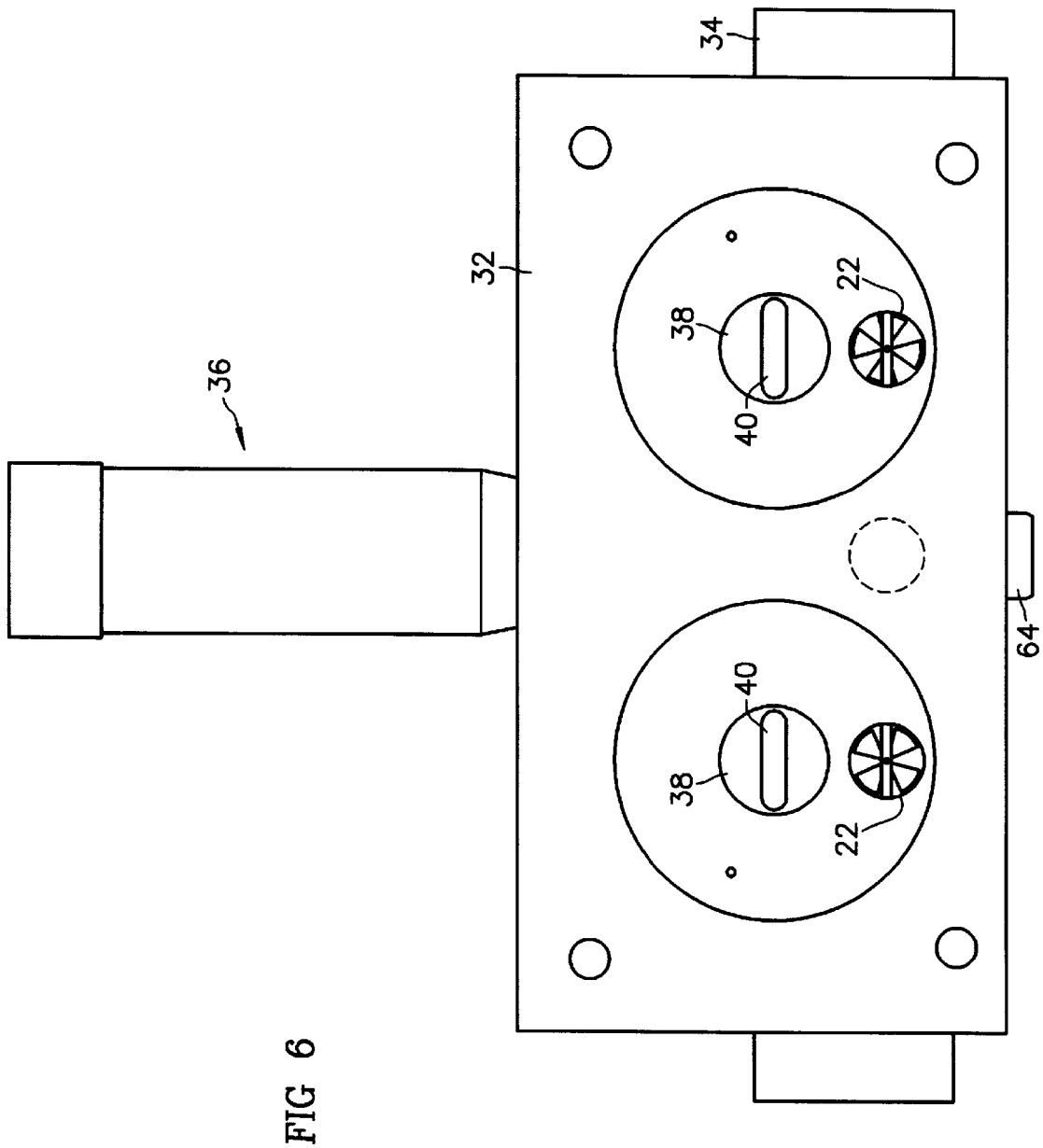
FIG. 6 is a rear view of the assembly, in the direction of arrow VI in FIG. 2.

Referring now to the drawings in more detail, reference numeral 10 (FIG. 7) generally indicates a soft-serve dispensing machine which comprises a freezer cylinder or barrel 12, a mix hopper 14 for soft-serve mix 16, and an air tube assembly 18 through which mix and air can flow into the freezer barrel. The machine further comprises a beater assembly 20 which is rotatable in the freezer barrel 12, the beater assembly having helical elements which carry scraper blades. The beater assembly serves to blend air and mix, to scrape frozen mix from the inside of the freezer barrel, and to eject frozen mix through an outlet port 22 at the front of the freezer barrel, from where the product eventually reaches a draw spout. A beater motor 24 is provided to rotate the beater assembly 20 in the freezer barrel 12. The parts described thus far in this paragraph are of conventional construction.

In the conventional soft-serve dispensing machine the outlet port 22 is formed in a removable freezer door assembly which closes the front end of the freezer barrel 12 and is held in position by means of nuts which are tightened onto threaded studs of the barrel. The freezer door assembly conventionally has a rearwardly protruding bearing hub for rotatably supporting the front end of the beater assembly, and also a pair of baffle rods which pass from front to rear of the freezer barrel, through the interior of the beater assembly. The rear ends of the baffle rods are joined to form an elongated U.

In the soft-serve machine of the present invention the conventional freezer door assembly is replaced by a freezer door assembly 30 whose construction will now be described.

Figure 2:
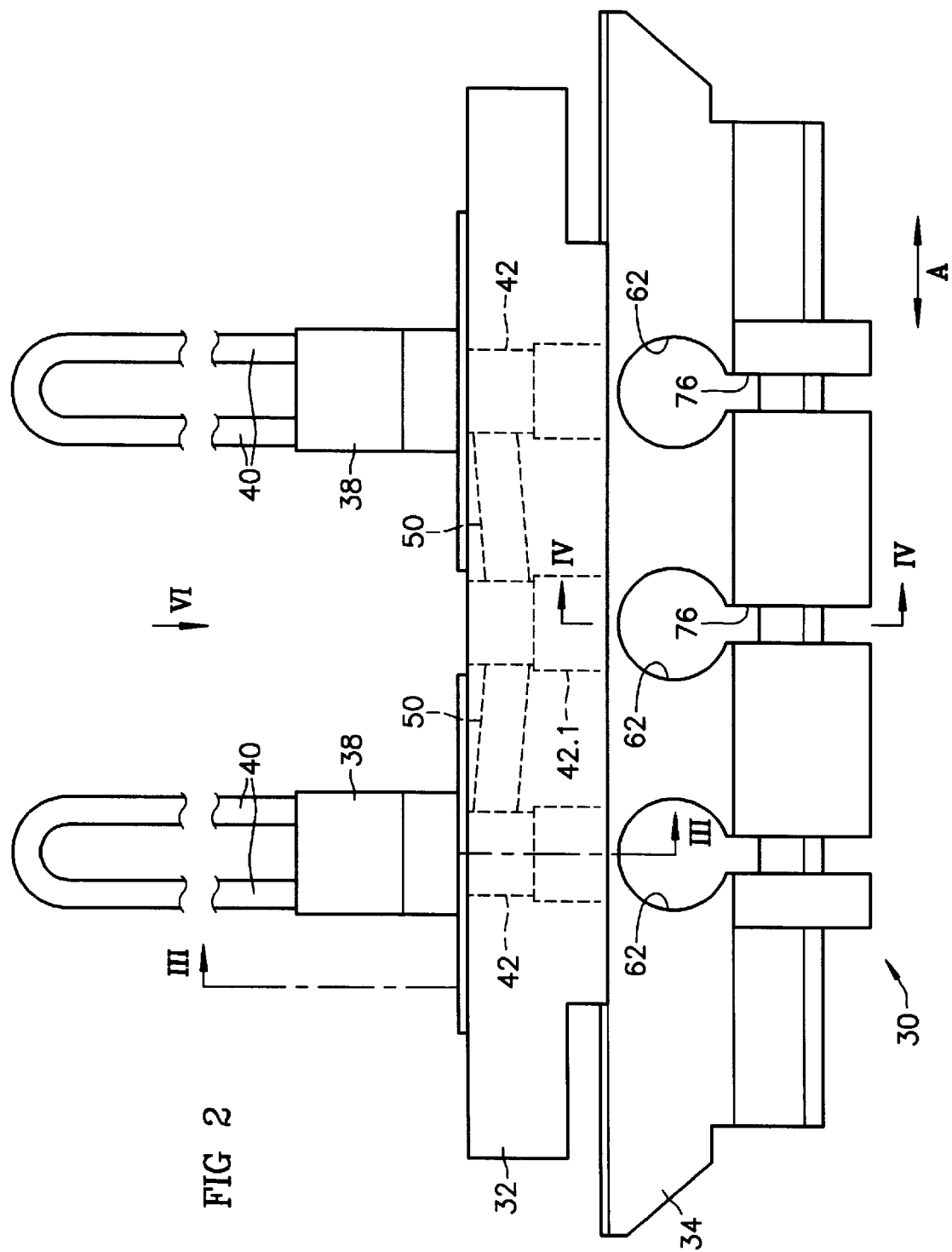
FIG. 2 is a view in the direction of arrow II in FIG. 1, with the topping unit forming part of the assembly having been removed.

The freezer door assembly 30 comprises a door plate 32, a carrier 34 mounted on the door plate so as to be slidable with respect to the door plate in the direction of arrows A in FIG. 2, and a topping unit 36 mounted on the carrier 34. Although only one topping unit 36 is shown in the drawings, provision is made for three topping units, each of which may contain a different topping.

The door plate 32 is designed for a soft-serve dispensing machine having two mix hoppers. It therefore has two bearing hubs 38 and two pairs of baffle rods 40, these being of conventional construction. It also has two outlet ports 22.

Each outlet port 22 leads via a passage 42 from the rear to the front face of the door plate. In the passage 42 there is a turbine wheel 44 having vanes 46. The turbine wheel 44 is journalled in a pair of cross bars 48 extending across the passage 42.

Passages 50 lead transversely from each of the passages 42, upstream of the respective turbine wheel 44, to a third passage 42.1 between the passages 42. The passage 42.1 is blanked off at the rear. Like the passages 42, the passage 42.1 opens to the front of the door plate 32 and has a turbine wheel 44 mounted therein.

The topping unit 36 comprises a topping hopper 52 and a hollow cylindrical plunger 54 which extends down from the lower end of the topping hopper. Inside the plunger 54 there is an archimedes screw 56 which has a shaft 58. The shaft 58 is connected to the low speed output of a topping motor 60 for metering a solid topping such as chocolate chips, nuts, or the like, into a serving of frozen mix.

The plunger 54 can move up and down in a vertical bore 62 in the carrier 34, the plunger making sealing contact with the walls of the bore. At the lower end of the bore 62 there is a fitting 64 which forms a draw spout. The top face of the fitting 64 has an annular groove therein in which an O-ring 66 is accommodated. When the topping unit 36 is in its lowermost or closed position, the lower end face of the plunger 54 seats in a fluid tight manner on the O-ring 66.

The plunger 54 is provided with a rack 68, and on the carrier 34 there is a sector gear 70 which meshes with the rack. The sector gear 70 has a draw handle 72 fixed thereto, the assembly of sector gear and draw handle being pivotally displaceable with respect to the carrier on a pin 74. Thus, by operating the draw handle 72, the entire topping unit 36, including the plunger 54, can be moved up or down with respect to the carrier 34. There is a vertical groove 76 in the bore 62 to accommodate the rack 68. A port 78 leads sideways into the bore 62. By shifting the carrier transversely with respect to the door plate 32, the port 78 can be brought into alignment with any one of the passages 42 and. 42.1. This enables a serving of either one of two mixes, or of a combination of the two mixes to be dispensed. O-rings 79 are provided on the front face of the door plate 32, to form a seal at the interface between the door plate and the carrier 34.

When the plunger 54 is in its closed position 35 product cannot flow into the bore 62. When the plunger is lifted off the O-ring 66 and beyond the lower reaches of the port 78, product is able to flow into the bore 62 and from there out through the draw spout 64.

The door plate 32 is provided with a first, rotation sensor 80 which is located in close proximity to the turbine wheel 44, the rotation sensor being capable of sensing rotation of the turbine wheel. For example, the rotation sensor 80 may be such as to provide one pulse for each passage of a vane 46 as the turbine wheel rotates.

The door plate 32 is further provided with a second sensor or temperature probe 82 which is able to sense the temperature of the product as it leaves the freezer barrel 12 via the outlet port 22. Finally, there is provided an operating switch 84 which changes state when the draw handle 72 is operated to dispense a serving of product.

The rotation sensor 80, the temperature probe 82, and operating switch 84 are connected to a control unit 86, the operation of which will now be described with reference to the block diagram of FIG. 8. The function of the control unit 86 is largely software implemented. Pulses arriving from the rotation sensor 80 are integrated at 88 to provide an indication of accumulated volume of flow. The pulses are further differentiated at 90, to provide an indication of the flow rate.

When the plunger 54 is lifted, the conventional beater motor control of the soft-serve machine is set into operation as indicated at 92. Furthermore, the following steps are executed. First, there is an (optional) waiting period for allowing a clearance volume to be dispensed, as indicated at 94. Thereafter, the topping motor 60 is set into operation via a topping motor control as indicated at 96, the topping motor being controlled to rotate at a speed which is proportional to the rate at which product flows through the relevant turbine wheel 44, as sensed by the rotation sensor 80. The process is terminated when the operating switch 84 detects that the plunger 54 has been returned to its closed position, as indicated at 98.

The output of the temperature probe 82 is monitored and compared with various adjustable set points as indicated at 100. In the example illustrated there are three set points, namely −4° C., −6° C., and −8° C.

The control unit 86 further provides for a register to keep a cleaning volume log as indicated at 102, a register for keeping a serving volume log as indicated at 104, and a beater motor disable function as indicated at 106. Numerical displays (not shown) may be provided for displaying the volumes, quantities such as price corresponding to these values, rates of flow, and so on.

When the temperature is −4° C. or higher and the turbine wheel 44 running, this is an indication that the soft-serve machine is performing a cleaning cycle, in which event the flow volume is recorded in the cleaning volume log 102. When the temperature is between −4° C. and −6° C., this is an indication that the product is too soft and the beater motor 24 is disabled. If the temperature is between −60° C. and −8° C., this is an indication that the product is at the right temperature, in which event flow volume is recorded in the serving volume log 104. If the temperature is lower than −8° C. this is an indication that the product is at too low a temperature, which may lead to damage of the beater assembly. As a result, the beater motor is disabled.

What is claimed is:

1. A machine for dispensing a soft-serve product, the machine comprising a freezer barrel, a mix hopper for containing soft-serve mix and being in flow communication with the freezer barrel so that soft-serve mix can flow from the mix hopper into the freezer barrel, a draw spout, a primary flow passage leading from the freezer barrel to the draw spout, means for expelling frozen product from the freezer barrel via the primary flow passage to the draw spout, a solids hopper for containing a flowable solid food product, a plunger for openably closing the primary flow passage and having a secondary flow passage therein, the secondary flow passage leading from the solids hopper into the primary flow passage, and feed means for feeding said solid food product from the solids hopper via the secondary flow passage into the flow stream of soft-serve product as it passes through said primary flow passage.

2. A machine as claimed in claim 1, wherein the feed means is in the form of an archimedes screw mounted for rotation in the secondary flow passage.

3. A machine as claimed in claim 2, which includes a solids feed motor for driving the archimedes screw, flow metering means for metering the flow of soft-serve product through the primary flow passage, and control means which is operative in response to the flow metering means to control the speed of the solids feed motor so as to be proportional to the flow rate of soft-serve product through the primary flow passage.

4. A machine as claimed in claim 3, wherein the flow metering means comprises a vaned rotor in the primary flow passage, and sensing means for sensing rotation of the vaned rotor.

5. A machine as claimed in claim 3, which includes numerical display means, the numerical display means being operative in response to the flow metering means to display a numerical quantity corresponding to the flow of soft-serve product through the primary flow passage.

6. A machine for dispensing a soft-serve product, the machine comprising a freezer barrel having a front end, a removable door plate closing the front end, a mix hopper for containing soft-serve mix and being in flow communication with the freezer barrel so that soft-serve mix can flow from the mix hopper into the freezer barrel, a draw spout, a flow passage leading from the freezer barrel through the door plate to the draw spout, means for expelling frozen product from the freezer barrel via the flow passage to the draw spout, and flow metering means for metering the flow of soft-serve product through the flow passage, the flow metering means comprising a vaned rotor in the flow passage at a location where the flow passage passes through the door plate, and sensing means for sensing rotation of the vaned rotor.

7. A machine as claimed in claim 6, which includes a register for recording the flow of soft-serve product through the flow passage.

8. A machine as claimed in claims, which includes numerical display means, the numerical display means being operative in response to the flow metering means to display a numerical quantity corresponding to the flow of soft-serve product through the flow passage.

* * * * *